United States Patent
Lepage

(10) Patent No.: US 10,775,346 B2
(45) Date of Patent: Sep. 15, 2020

(54) VIRTUAL CHANNELS FOR EDDY CURRENT ARRAY PROBES

(71) Applicant: OLYMPUS AMERICA INC., Center Valley, PA (US)

(72) Inventor: Benoit Lepage, Québec (CA)

(73) Assignee: OLYMPUS AMERICA INC., Center Valley, PA (US)

( * ) Notice: Subject to any disclaimer, the term of this patent is extended or adjusted under 35 U.S.C. 154(b) by 583 days.

(21) Appl. No.: 15/419,196

(22) Filed: Jan. 30, 2017

(65) Prior Publication Data
US 2018/0217099 A1    Aug. 2, 2018

(51) Int. Cl.
*G01N 27/90* (2006.01)
*G01N 27/82* (2006.01)

(52) U.S. Cl.
CPC ......... *G01N 27/9046* (2013.01); *G01N 27/90* (2013.01); *G01N 27/82* (2013.01); *G01N 27/9053* (2013.01)

(58) Field of Classification Search
CPC .... G01N 27/9046; G01N 27/02; G01N 27/90; G01N 27/23
See application file for complete search history.

(56) References Cited

U.S. PATENT DOCUMENTS

| | | | | |
|---|---|---|---|---|
| 8,125,219 | B2 * | 2/2012 | Jungbluth | G01N 27/9046 324/239 |
| 2001/0052905 | A1 * | 12/2001 | O'Connor | G01N 27/9026 345/591 |
| 2006/0132123 | A1 * | 6/2006 | Wang | G01N 27/902 324/239 |
| 2008/0040053 | A1 * | 2/2008 | Plotnikov | G01N 27/9046 702/38 |
| 2014/0198824 | A1 * | 7/2014 | Nagl | G01K 1/20 374/163 |
| 2016/0356743 | A1 * | 12/2016 | Miki | G01N 27/9053 |
| 2017/0059683 | A1 * | 3/2017 | Hughes | G01R 35/005 |

* cited by examiner

*Primary Examiner* — Mohamed Charioui
*Assistant Examiner* — Christine Y Liao
(74) *Attorney, Agent, or Firm* — Schwegman Lundberg & Woessner, P.A.

(57) ABSTRACT

Disclosed is an apparatus and method for generating virtual inspection channels mid-way between the physical inspection channels of an eddy current array probe, thereby reducing the coverage loss and improving defect sizing and imaging. The method is based upon a calibration to determine the mid-channel coverage loss for parallel defects having their long axis parallel to the scanning direction. Based on the coverage loss measurement, a vector analysis system is constructed enabling generation of virtual channel signals which are available for processing in the same way as physical channels, with impedance plane representation including real and/or imaginary signal components. The system differentiates between parallel and perpendicular defects and employs different algorithms to generate virtual channel signals for parallel and perpendicular defect orientations.

19 Claims, 12 Drawing Sheets

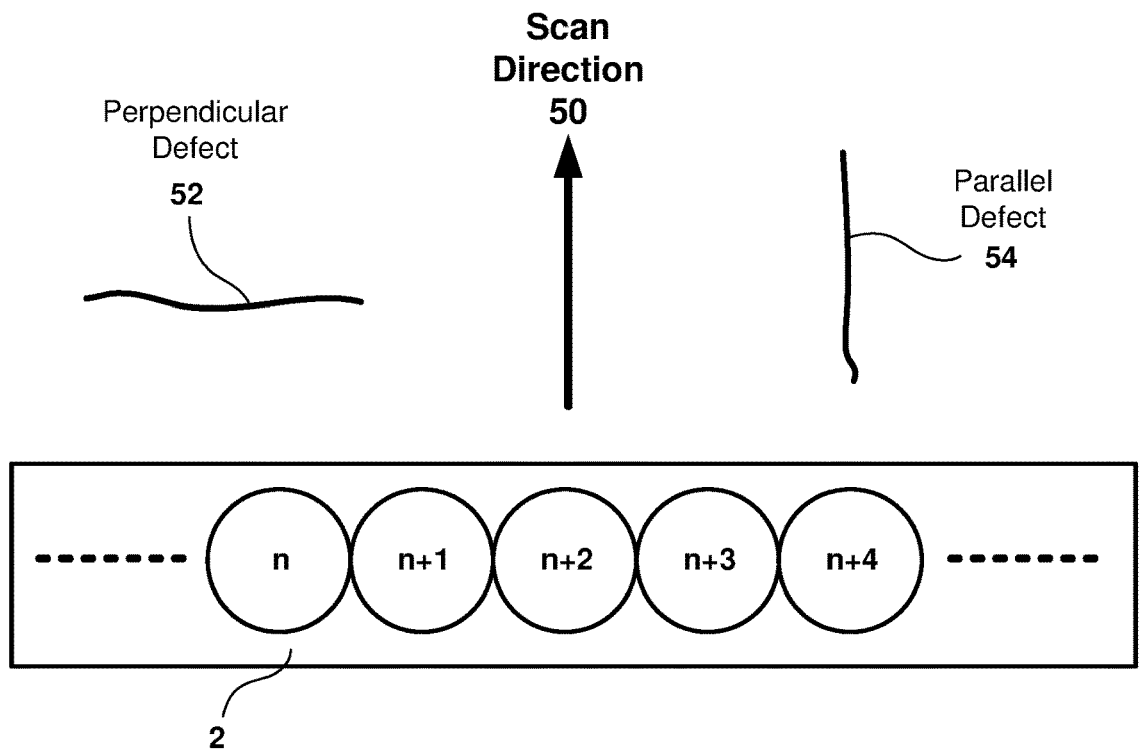
Fig. 5A
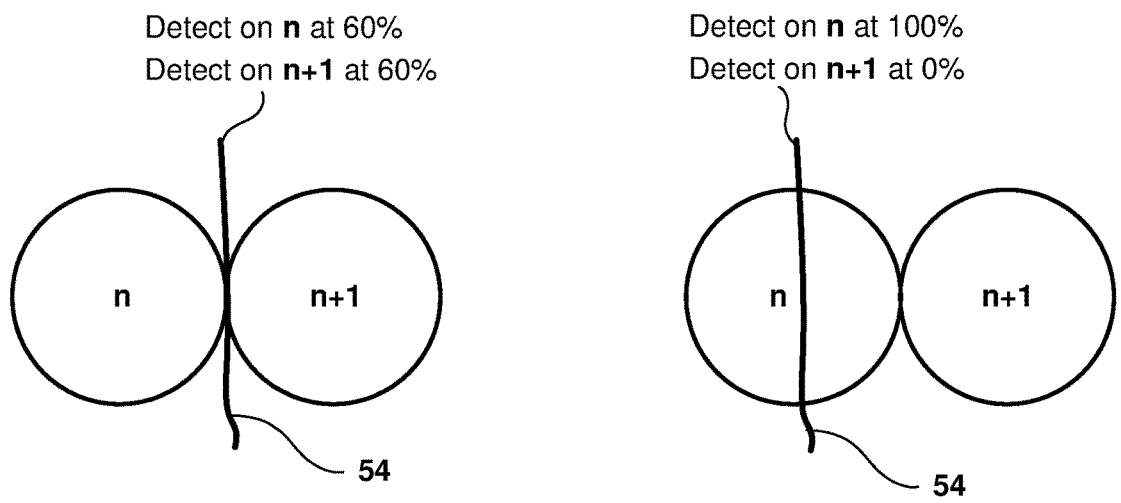
Fig. 5B
Fig. 5C

VIRTUAL CHANNELS FOR EDDY CURRENT ARRAY PROBES

FIELD OF THE INVENTION

The invention relates to an eddy current (EC) array inspection system used for non-destructive test and inspection (NDT/NDI), and more particularly to an apparatus and method for improving the reproducibility of EC array systems by generating virtual channels between the physical channels of the EC array.

BACKGROUND OF THE INVENTION

The use of EC array probes for NDT/NDI is well known in existing practice. Generally, an EC array probe comprises a multiplicity of individual EC sensors, each individual EC sensor comprising eddy current coils. Some of the coils are configured as driver coils, creating a variable magnetic field in a test object, while other coils are configured as sensing coils which detect magnetic fields generated by eddy currents in the test object. In some embodiments, the same coil can simultaneously serve both driver and sensing functions. Each individual EC sensor has a center point where there is maximum sensitivity to eddy currents, and therefore maximum sensitivity for detection of defects. This center point is hereinafter referred to as the center of a physical channel of the individual EC sensor. In operation, the EC array probe is scanned near the surface of the test object, and each individual EC sensor is most sensitive to defects in an inspection channel represented by the trajectory path of the center point of the physical channel.

A common problem in EC array testing is the signal amplitude variation due to the limited channel coverage of each probe. The variation, usually referred to as "coverage loss", is caused by reduction in sensitivity to defects which are not directly under the center point of any sensor, but are located in the space between adjacent sensors where sensitivity is reduced. Consequently the received signal from a given defect, particularly a defect oriented parallel to the direction of motion of the array, will depend on the location of the defect relative to the individual EC sensors.

U.S. Pat. No. 8,125,219 by Jungbluth et al discloses synthetic crack signals which may be positioned between channels in order to reduce coverage loss. However, the interpretation of such signals is based on very specific knowledge of the flaw, and no method is disclosed for creating intermediate virtual channels whose generation is based solely on the physical properties of the coils with no a priori knowledge of the defect being required.

Therefore there exists a need for a general method to reduce the signal variability due to coverage loss, and thereby to enhance the probe resolution and provide better defect imaging.

SUMMARY OF THE INVENTION

Accordingly, it is a general objective of the present disclosure to provide a system and method in Eddy Current Array applications to reduce coverage loss by providing one or more virtual channels, calculated based on the properties of the physical channels.

It is a further objective of the present disclosure to provide one or more virtual channels which are represented in the same way as physical channels in an impedance plane representation having both real and imaginary components, but having maximum sensitivity mid-way between adjacent physical channels.

It is a further objective of the present disclosure to provide one or more virtual channels by using vector interpolation of EC signals from pairs of adjacent physical channels, with the vector system being based on measurements of coverage loss for calibration defects located mid-way between physical channels.

It is yet another objective of the present disclosure to provide virtual channels for EC array application located mid-way between physical channels, wherein the virtual channels are available for interpolation of signals from defects located at any position between the physical channels. Since the virtual channels compensate for coverage loss, their use provides improved probe sensitivity and defect imaging.

BRIEF DESCRIPTION OF THE DRAWINGS

FIG. 5A is a schematic illustration of defect and array probe orientations.

FIG. 5B is a schematic illustration of a parallel defect located mid-way between sensor center points.

FIG. 5C is a schematic illustration of a parallel defect located at a sensor center point.

DETAILED DESCRIPTION OF PREFERRED EMBODIMENT

Figure 1:
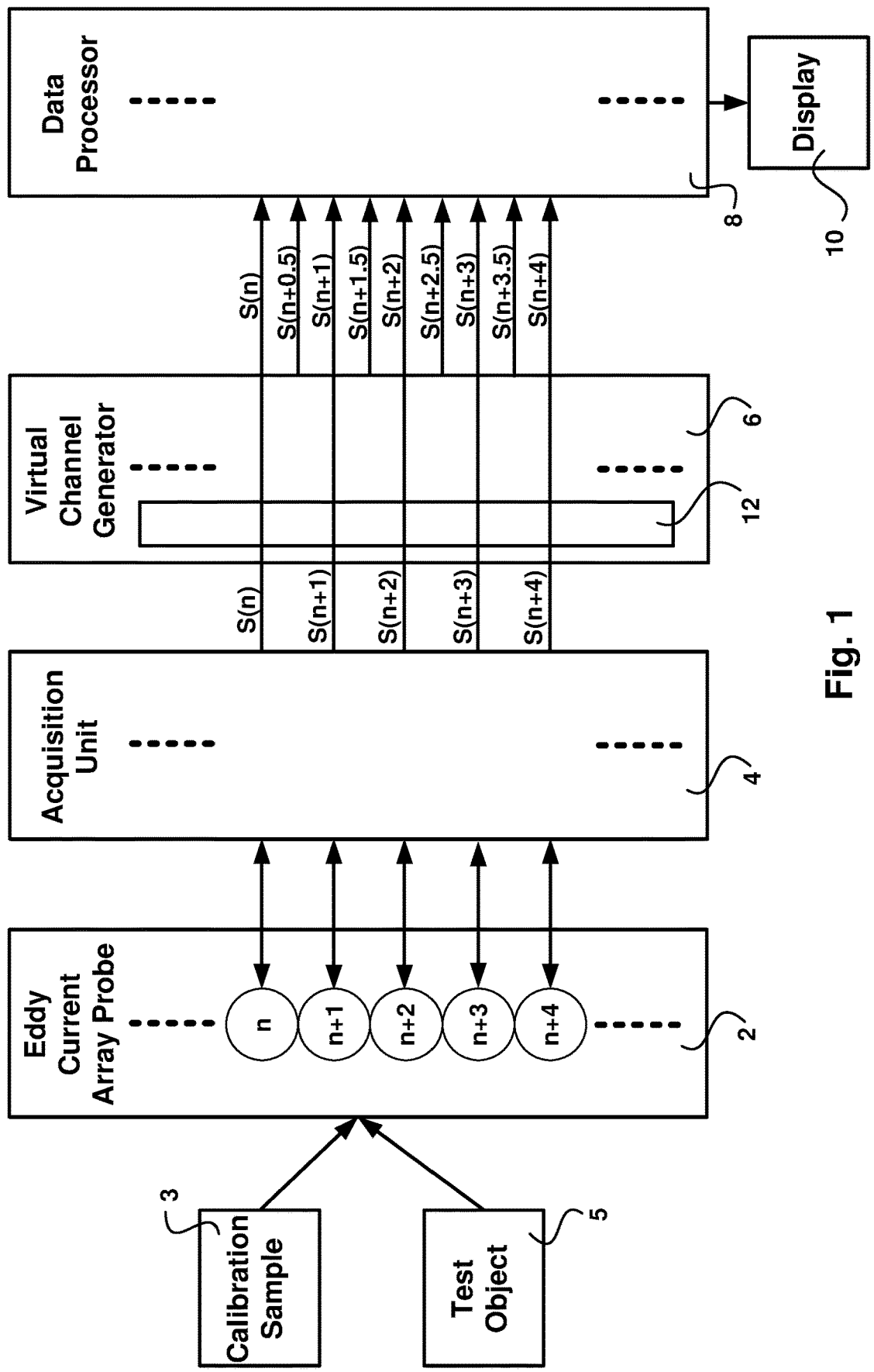
FIG. 1 is a schematic representation of an eddy current instrument according to the present disclosure.
Figure 2:
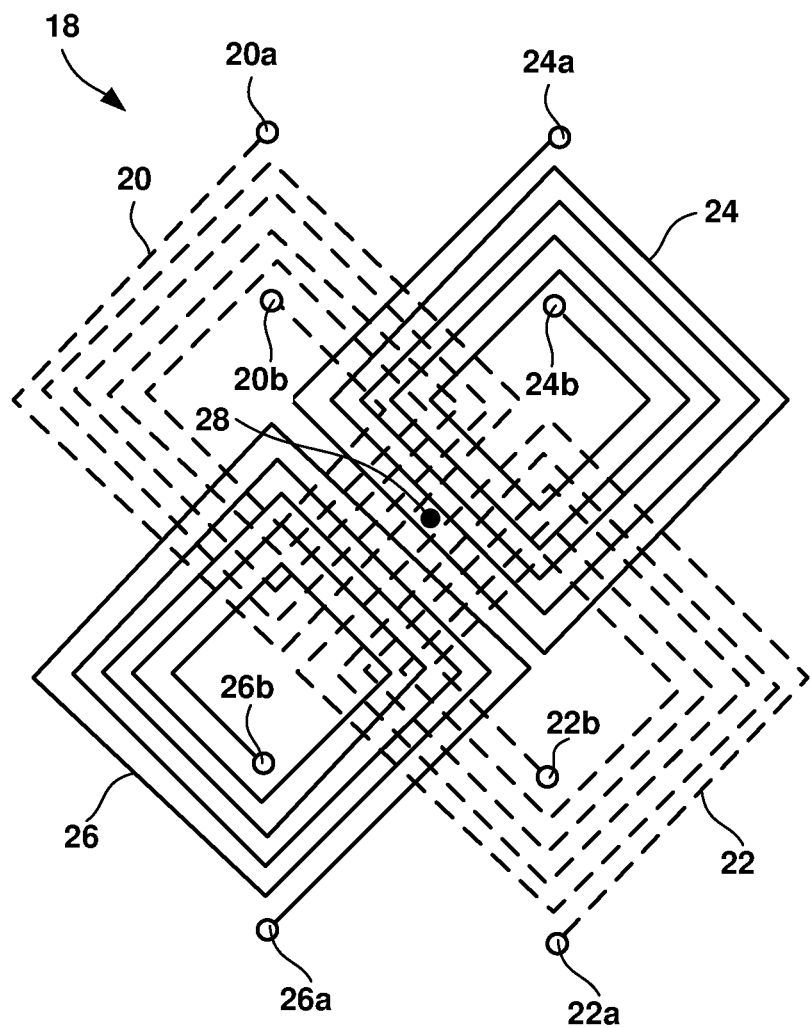
FIG. 2 is a schematic of an exemplary individual EC probe.

FIG. 1 is a schematic representation of an EC instrument configured according to the present disclosure. An EC array probe 2 comprises a multiplicity of individual EC sensors, with representative individual EC sensors depicted as circles in the figure and labeled n, n+1, n+2, n+3 and n+4. It is to be understood that each of the representative circles comprises a multiplicity of coils, and any particular coil at a specific time may be configured as a driver coil or as a sensing coil or as both a driver and a sensor. The coil configuration of an exemplary individual EC sensor is shown in FIG. 2.

Referring again to FIG. 1, EC array probe 2 is configured to be mechanically scanned near the surface of a calibration sample 3 when the EC instrument is in calibration mode, or near the surface of a test object 5 when the EC instrument is in testing mode. An acquisition unit 4 is configured to send commands for energizing the driver coils of each of the individual EC sensors of EC array probe 2, and to receive EC signals from the sensing coils of each of the individual EC sensors. The EC signals are digitized and are output from acquisition unit 4 as digital signals S(n), S(n+1), S(n+2), S(n+3) and S(n+4). A virtual channel generator 6 receives the digital signals and generates a virtual channel S(n+0.5) by a vector combination of signals S(n) and S(n+1), a virtual channel S(n+1.5) by a vector combination of signals S(n+1) and S(n+2), a virtual channel S(n+2.5) by a vector combination of signals S(n+2) and S(n+3), and a virtual channel S(n+3.5) by a vector combination of signals S(n+3) and S(n+4). The acquired digital channels S(n), S(n+1), S(n+2), S(n+3) and S(n+4) and the virtual channels S(n+0.5), S(n+1.5), S(n+2.5) and S(n+3.5) are sent to a data processor 8 which processes all the acquired channels and the virtual channels in the same way and finally generates a display 10 of the processed data.

Virtual channel generator 6 may optionally further comprise an orientation determination unit 12, whose purpose is to determine the orientation of the one or more defects which are responsible for the EC signals received by virtual channel generator 6. As described below, virtual channel generator 6 is thereby able to use different algorithms to generate virtual channel data for defects having different orientation.

Note that an important aspect of the present invention is that the virtual channels are available to data processor 8 in the same way as physical channels, with impedance plane representation including real and/or imaginary signal components. Data processor 8 may therefore process the data as though the number of channels has been doubled, with resulting improvement in the resolution and sensitivity of the EC measurement.

FIG. 2 illustrates the coils of an exemplary individual EC sensor 18, which is an embodiment of one of the individual EC sensors shown as circles in FIG. 1. Probe 18 has a sensor center point 28 and comprises two pairs of coils. A coil 20, having electrical connection terminals 20a and 20b, is paired with a coil 22 having electrical connection terminals 22a and 22b. A coil 24, having electrical connection terminals 24a and 24b, is paired with a coil 26 having electrical connection terminals 26a and 26b. Coils 20, 22, 24, and 26 may be made as metallic traces on a printed circuit board, or by any other means. Coil pair 20, 22 overlaps coil pair 24, 26, but there is no electrical contact between coils. Each of coils 20, 22, 24, and 26 may be configured as either a driver coil or a sensing coil or both driver and sensor, and the function of any coil may be switched between driver or sensor at any desired switching frequency. Individual EC sensor 18 may be configured as an orthogonal sensor, in which the magnetic field of the driver coils is configured to be orthogonal to the sensitive direction of the corresponding sensing coils. The advantage of an orthogonal probe is that the sensor provides an EC response signal that depends on the orientation of the defect. For the purposes of the present disclosure, individual EC sensor 18 is preferably an orthogonal sensor.

It should be noted that the coil configuration of individual EC sensor 18 is presented as an exemplary embodiment. The number, shape and geometric configuration of the coils may be varied to be any number of coils of any shape and any geometric configuration. The coils may be wound in a three dimensional configuration, such as a cube or a polygonal prism. Alternatively, the coils may be planar metallic traces constructed in layers on a printed circuit board. All such variations of the sensor and its coils are within the scope of the present disclosure.

Figure 3:
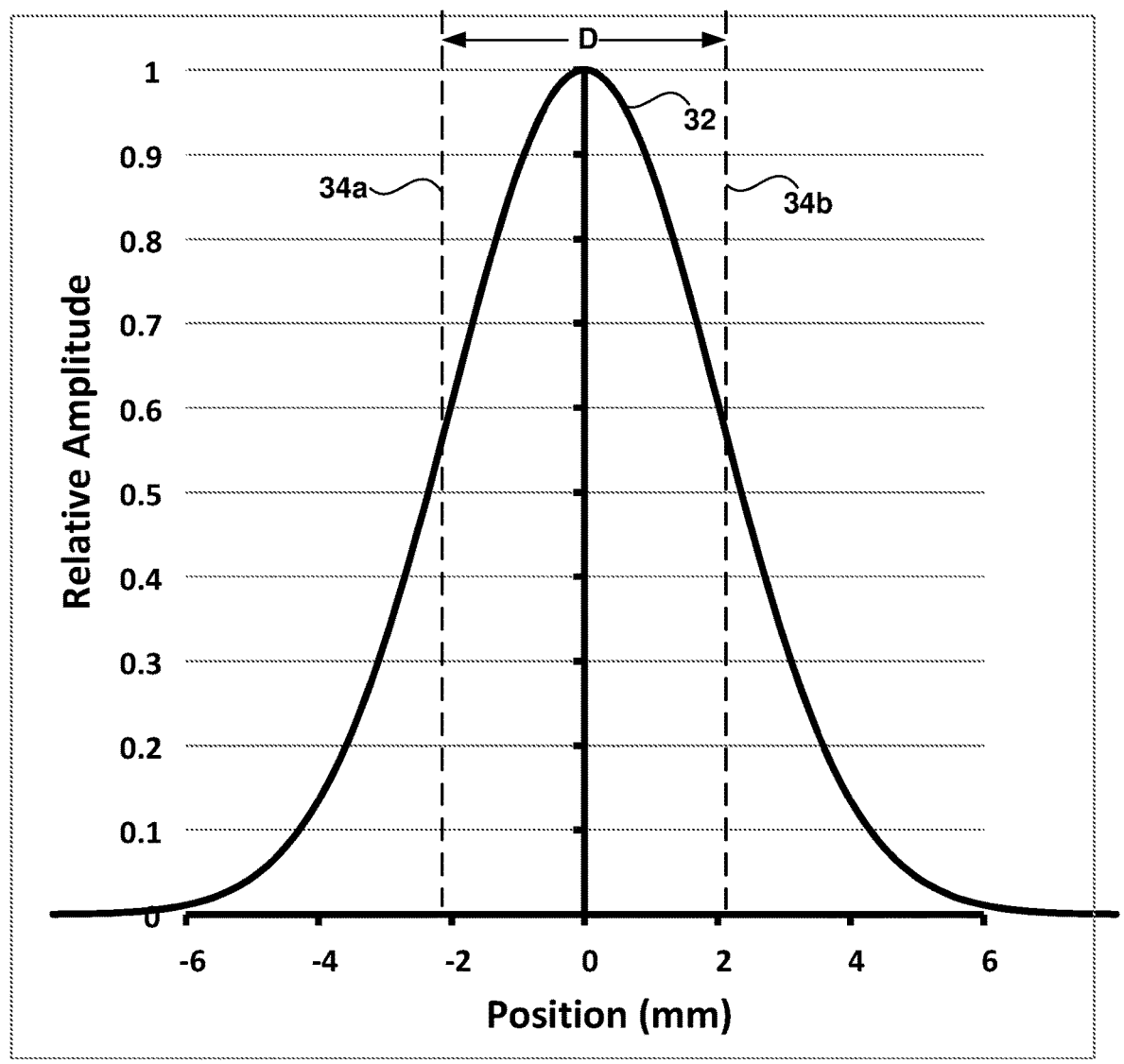
FIG. 3 is a graph of coverage loss for a parallel defect vs its position relative to the sensor center point.

FIG. 3 shows a graph 32 illustrating the concept of coverage loss. Graph 32 is a sensitivity curve of an exemplary individual EC sensor, wherein the sensitivity curve is a plot of EC signal amplitude for a parallel defect 54 (as shown in FIGS. 5A, 5B and 5C) vs position of defect 54 relative to the center point of the sensor. Also shown is a representation of the distance D between the center points of adjacent sensors. It can be seen that, for the embodiment of FIG. 3, the detection amplitude for a parallel defect mid-way between sensors, represented by lines 34a and 34b, is 60% of the peak amplitude for a defect located at the sensor center point. This is the coverage loss for the EC sensor. A general expression for coverage loss is given by the following equation:

$$\text{coverage loss} = \frac{EC \text{ signal amplitude midway between channels}}{\text{maximum } EC \text{ signal amplitude}} \quad (1)$$

Note that measurement of sensitivity curve 32 and determination of coverage loss according to equation (1) is done when array probe 2 is in calibration mode scanning near the surface of calibration sample 3. In calibration mode, parallel defect 54 is a machined calibration defect at the surface of calibration sample 3. Note also that the conditions of scanning, such as the lift-off of the probe above the surface, should be the same in calibration mode as in testing mode.

Figure 4:
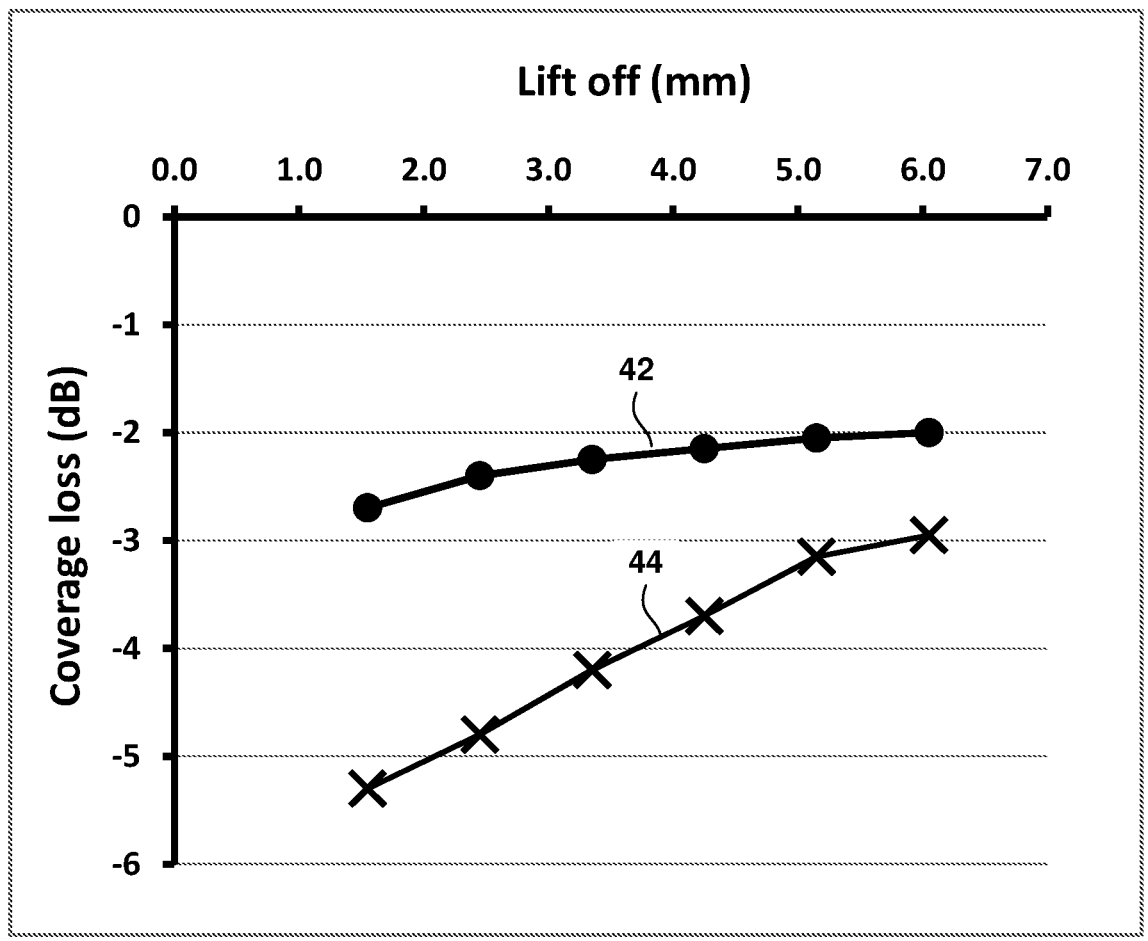
FIG. 4 shows graphs of coverage loss vs lift off distance for an exemplary individual EC sensor.

FIG. 4 shows graphs illustrating that the coverage loss of EC probes in existing practice depends on the material of the test object and the lift-off, wherein lift-off is defined as the distance between the sensor and the surface of the test object. A graph 42 is a plot of coverage loss vs lift-off when calibration sample 3 comprises a non-ferromagnetic material, and a graph 44 is a plot of coverage loss vs lift-off when calibration sample 3 comprises a ferromagnetic material. It should be noted that a primary objective of the present disclosure is to minimize the coverage loss in existing practice as shown in graphs 42 and 44.

FIG. 5A illustrates EC array probe 2 being scanned in a scan direction 50 over the surface of test object 5 or calibration sample 3. Test object 5 or calibration sample 3 has a perpendicular defect 52 having a long dimension generally perpendicular to scan direction 50, and a parallel defect 54 having a long dimension generally parallel to scan direction 50. Note that coverage loss will occur only for parallel defect 54. Perpendicular defect 52 will be detected at maximum intensity by at least one of the individual EC sensors of array probe 2, and therefore there is no coverage loss for perpendicular defect 52. FIG. 5B illustrates the situation where parallel defect 54 is located mid-way between individual EC sensors n and n+1. For probes having the exemplary sensitivity curve 32 shown in FIG. 3, parallel defect 54 will be detected at 60% intensity by both individual EC sensors n and n+1. FIG. 5C illustrates the situation where parallel defect 54 is located at the sensor center point of individual EC sensor n, and in this case parallel defect 54 will be detected at 100% by probe n and 0% by probe n+1.

Note that in FIG. 5C there is better peak detection (100% on channel n) when parallel defect 54 is located directly on channel n. However, when considering the total signal induced by parallel defect 54 on both channels n and n+1, there is a higher total response in FIG. 5B (60% on channel n and 60% on channel n+1). It is an objective of the present disclosure to use this total response phenomenon and to interpolate responses for locations of parallel defect 54 between physical channels, where virtual channels have been created.

Figure 6:
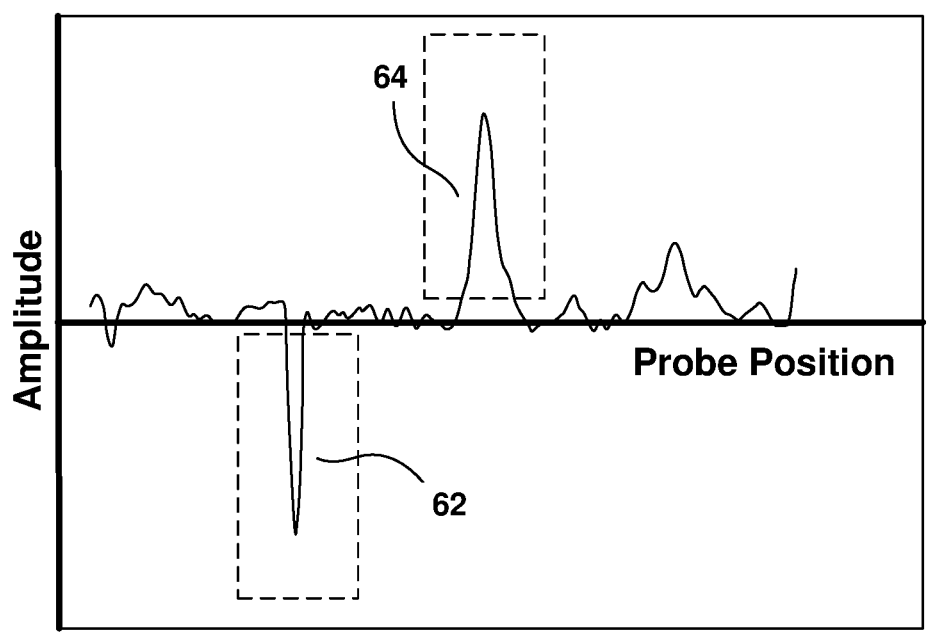
FIG. 6 is a graph of eddy current signals from an exemplary probe for a parallel and a perpendicular defect.

FIG. 6 shows an exemplary graph of EC signal amplitude vs position of array probe 2 along scan direction 50. In the example of FIG. 6, array probe 2 first senses a negative signal 62 caused by the presence of a perpendicular defect 52, and subsequently senses a positive signal 64 caused by the presence of a parallel defect 54. The polarity change of the EC signal is a consequence of using orthogonal sensors in array probe 2. However, it should be noted that other processes, such as use of filters, may be used to differentiate EC signals from parallel and perpendicular defects. Note also that an important aspect of the present invention is the ability to distinguish between EC signals from parallel and perpendicular defects, and to process them differently, thereby correcting the coverage loss from parallel defects, but only averaging the EC signals from perpendicular defects. The detailed algorithms are described below in connection with equations (6) and (7).

Figure 7:
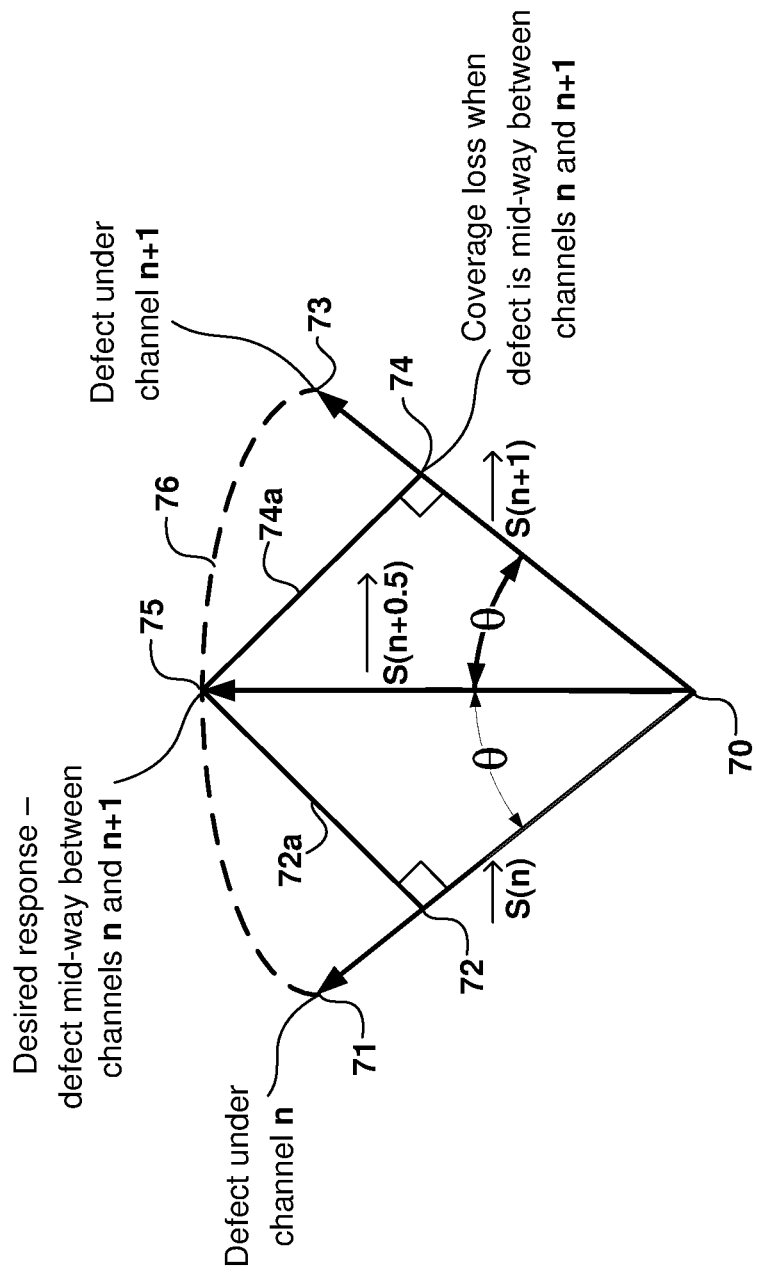
FIG. 7 is a vector addition diagram according to the present disclosure for a parallel defect located mid-way between sensor center points.

FIG. 7 shows a vector analysis system according to the present invention. The vector system configuration is defined in order to match the coverage loss calibration measurement by reference to a virtual channel located mid-way between each pair of physical channels. The vector system has an origin 70 and EC signal S(n) is represented by a vector whose length from origin 70 to a point 71 represents the EC signal intensity when parallel defect 52 is directly under channel n. Similarly, EC signal S(n+1) is represented by a vector whose length from origin 70 to a point 73 represents the EC signal intensity when parallel defect 52 is directly under channel n+1. When parallel defect 52 is mid-way between channels n and n+1, the EC signal intensity from channel n is represented by a vector from origin 70 to a point 72, and the EC signal intensity from channel n+1 is represented by a vector from origin 70 to a point 74. Lines 72a and 74a, drawn perpendicular from points 72 and 74 respectively, intersect at a point 75. According to the invention, S(n+0.5), the EC signal for a virtual channel mid-way between channels n and n+1 is given by a vector from origin 70 to point 75. Also according to the invention, point 75 lies at the mid-point of a line 76, wherein line 76 is the locus of EC signal vectors for parallel defects located at any position between channels n and n+1. It is a purpose of the present invention to determine the locus of line 76, so that the vector system may be used to interpolate the full defect response.

FIG. 7 shows an angle θ, which is the angle between vectors S(n) and S(n+0.5), and also the angle between vectors S(n+1) and S(n+0.5). Note that the vector system configuration is defined by setting angle θ so as to match the calibration mode coverage loss measurement by reference to the virtual channel signal S(n+0.5). Therefore:

$$\theta = \cos^{-1}(\text{coverage loss}) \quad (2)$$

Figure 8:
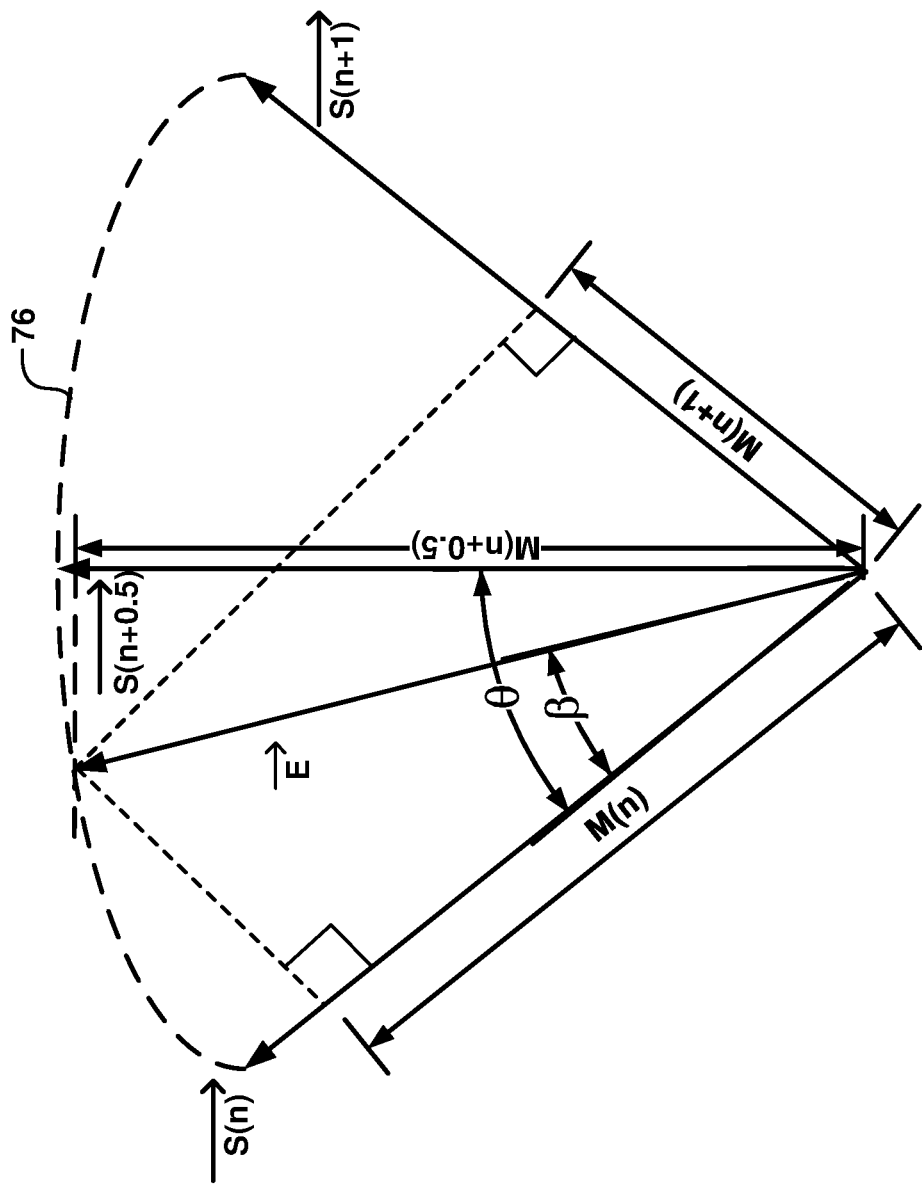
FIG. 8 is a vector addition diagram according to the present disclosure for a parallel defect located at any position between sensor center points.

FIG. 8 shows a vector diagram according to the present disclosure for a parallel defect in test object 5 which is located at any position between channels n and n+1. The actual defect location is represented by a vector E making an angle β with the vector S(n). It is to be understood that angle β may take any value from zero to 20, corresponding to a defect located at any position between the channels. The available responses due to the defect are the physical channel responses M(n) and M(n+1), and the corresponding vector dot product representations are given by:

$$\vec{E} * \vec{S(n)} = M(n) \quad (3)$$

$$\vec{E} * \vec{S(n+1)} = M(n+1) \quad (4)$$

In existing practice, the size of the defect is represented by the maximum channel response, which is given by M(n) for the exemplary defect E illustrated in FIG. 8. However, according to the present invention, virtual channel S(n+0.5) is generated so that:

$$\vec{E} * \vec{S(n+0.5)} = M(n+0.5) \quad (5)$$

Since the data for virtual channel S(n+0.5) is available to data processor 8 in the same way as data for physical channels S(n) and S(n+1), the size of the defect may be represented by the maximum value of S(n), S(n+0.5) or S(n+1). For the exemplary defect E illustrated in FIG. 8, the size would therefore be represented by M(n+0.5), which is closer to the actual amplitude of defect E than M(n). It is therefore seen that the accuracy of array probe 2 for sizing defects is improved by use of virtual channel S(n+0.5).

Figure 10:
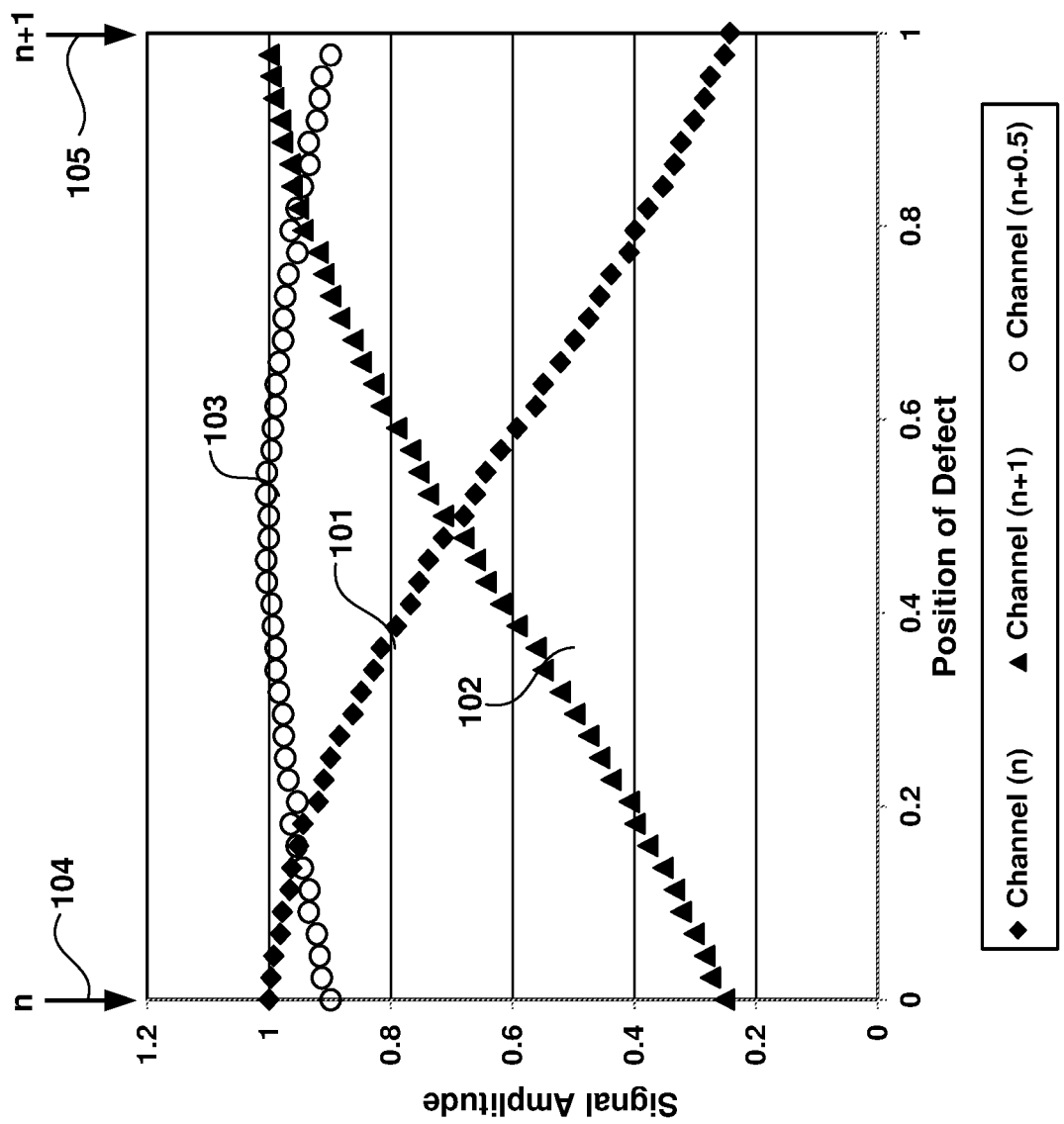
FIG. 10 shows graphs of channel coverage for adjacent physical channels and an intermediate virtual channel.

The advantage of generating a virtual channel is further illustrated in FIG. 10 which shows EC signal responses from a parallel calibration defect. A graph 101 shows EC signal amplitude from channel n, whose position on the graph is shown by an arrow 104. A graph 102 shows EC signal amplitude from channel n+1, whose position on the graph is shown by an arrow 105. A graph 103 shows the EC signal amplitude from virtual channel n+0.5, which is derived from signals from channels n and n+1 using equation (6) below. It is seen that the coverage loss is greatly reduced in the response of the virtual channel.

Figure 9:
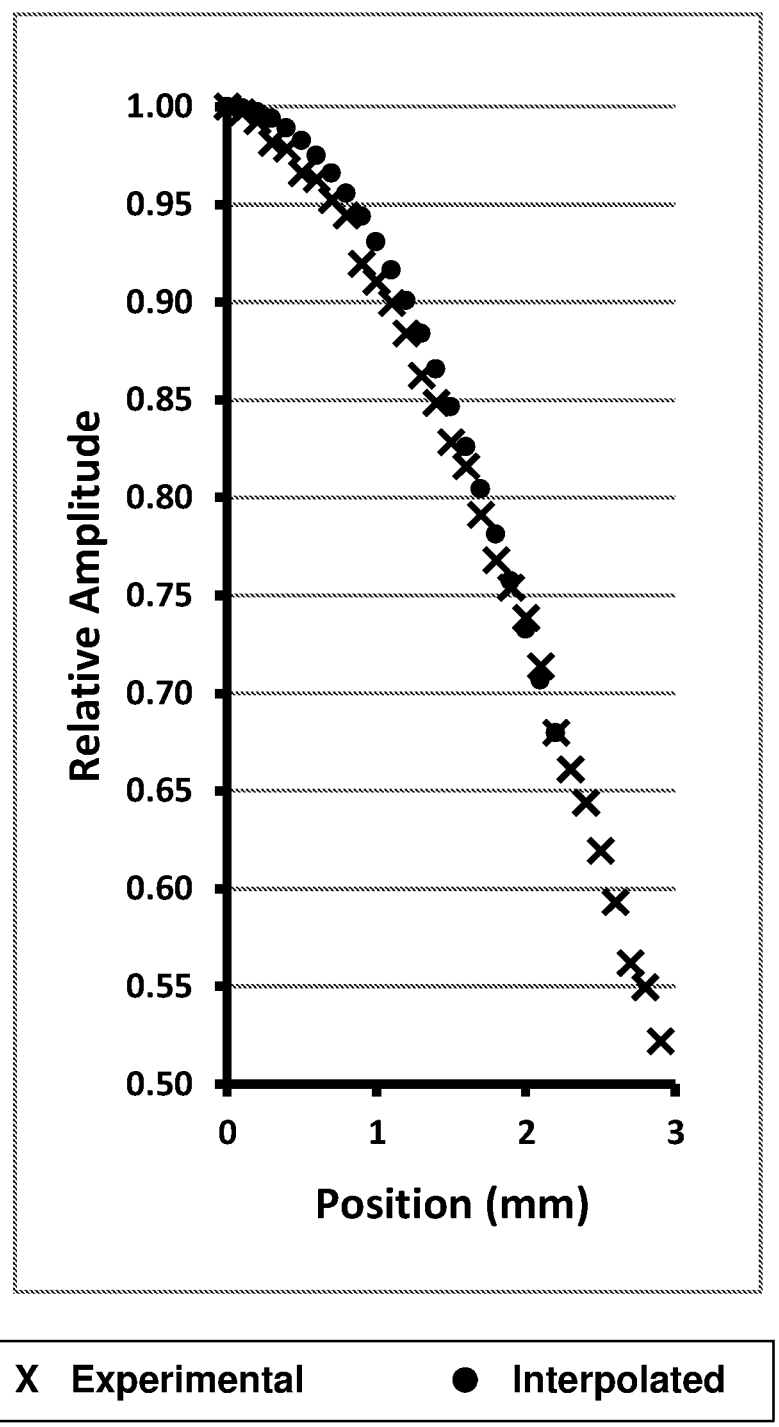
FIG. 9 shows graphs of EC signal amplitude vs position of a parallel defect, comparing experimental and interpolated results.

In deriving the vector representation shown in FIGS. 7 and 8, it is assumed that sensitivity curve 32 (see FIG. 3) can be approximated by the dot products of equations (3), (4) and (5) when the conditions of equations (1) and (2) are met. The validity of this approximation is demonstrated in FIG. 9 which shows an experimental sensitivity curve (x) plotted together with an interpolated sensitivity curve (●). The experimental curve was measured for a parallel calibration defect at various positions relative to the center point of a sensor. The interpolated curve was derived from measurements made only at adjacent physical channels and using equations (1)~(5). The maximum deviation of the interpolated curve from the experimental data is 0.23 dB The vector analysis of FIGS. 7 and 8, and resulting equations (1)~(5), are valid only for defects which are substantially parallel to scan axis 50. Perpendicular defects could simultaneously cross more than one physical channel, in which case there would be no coverage loss. From equations (1) and (2), it can be seen that attempting to generate a vector system would result in the value of angle θ being zero, which is an invalid vector system. However, as shown in FIG. 6, EC signals from parallel and perpendicular defects have opposite phase when using orthogonal sensors, so that they may be separately managed as described in connection with equations (6) and (7) below.

Based on the vector analysis of FIGS. 7 and 8 and equations (1)~(5), and after a calibration that sets positive responses for parallel defects and negative responses for perpendicular defects as shown in FIG. 6, an algorithm may be derived for building a virtual channel mid-way between physical channels n and n+1, as follows:

If $M(n) \geq 0$ or $M(n+1) \geq 0$ (6)

$$M(n+0.5) = \frac{M(n) + M(n+1)}{2\cos\theta}$$

else $$M(n+0.5) = \frac{M(n) + M(n+1)}{2}$$ (7)

Equations (6) and (7) are applied continuously for all adjacent individual EC sensor pairs throughout scan 50 of array probe 2, thereby generating a set of continuously available virtual channels having greatly reduced coverage loss as shown in FIG. 10. Equation (6) represents vector analysis applied to a parallel defect which generates a positive EC signal on either or both of channels n and n+1. The measured signals M(n) and M(n+1) are averaged and divided by cos θ in accordance with the vector analysis. Equation (7) is applied for perpendicular defects which are detected as negative EC signals. For perpendicular defects interpolation is not required and simple averaging is used.

Figure 11A:
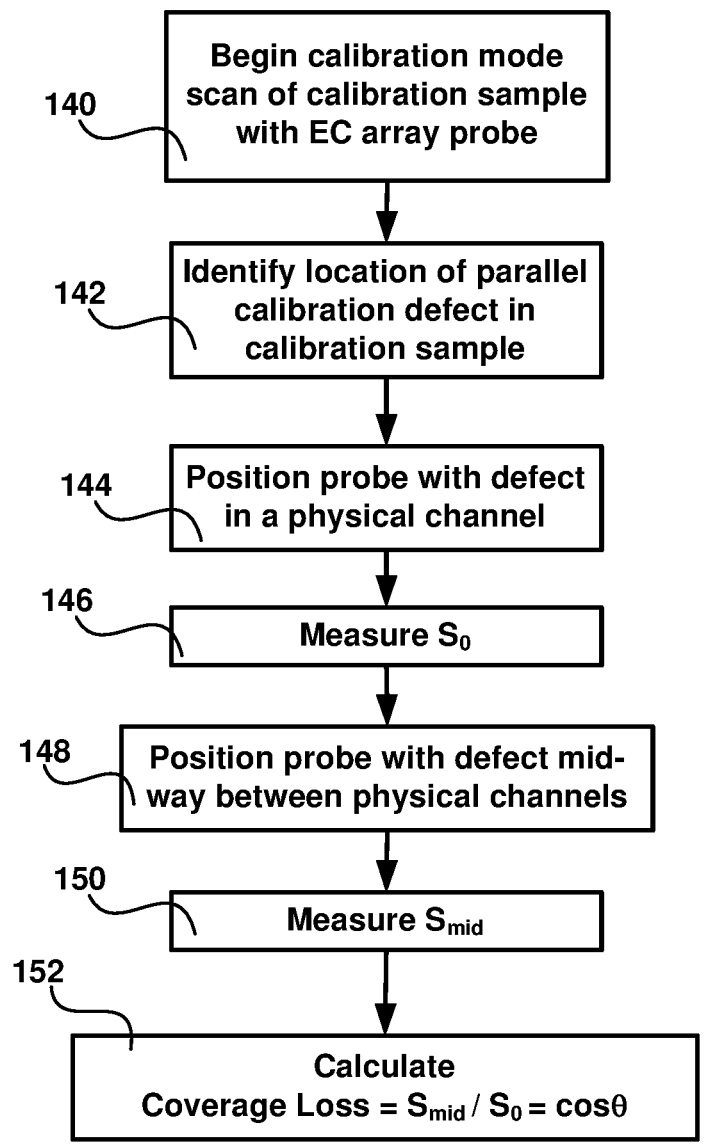
FIG. 11A is a schematic representation of a calibration method for measuring coverage loss during scanning of a calibration sample.
Figure 11B:
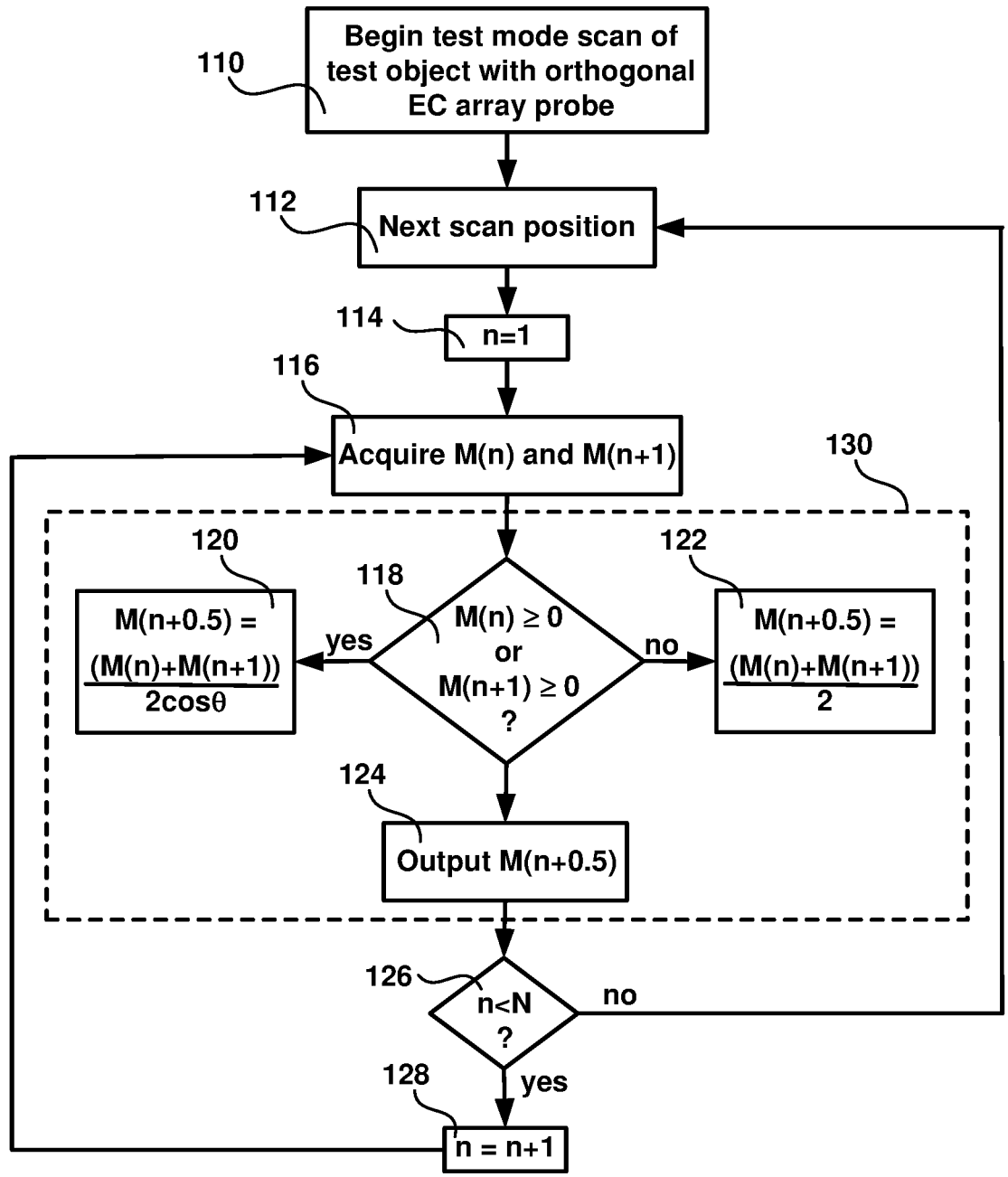
FIG. 11B is a schematic representation of a testing method for generating virtual channels during scanning of a test object.

FIGS. 11A and 11B illustrate the steps of a method in accordance with the present disclosure, the method comprising a calibration step illustrated in FIG. 11A and a testing step illustrated in FIG. 11B.

Referring to FIG. 11A, in step 140 calibration mode scanning on the surface of calibration sample 3 begins using EC probe array 2 having N individual EC sensors labelled n=1 to N. In step 142, location of a parallel calibration defect is identified on the surface of calibration sample 3. In step 144, probe array 2 is positioned with the defect at a physical channel of the probe, and in step 146, a maximum EC response signal $S_0$ of the physical channel is measured by acquisition unit 4. In step 148, probe array 2 is positioned with the parallel calibration defect mid-way between physical channels of the probe, and in step 146, a mid-way EC response signal $S_{mid}$ of the physical channel is measured by acquisition unit 4. In step 152, the coverage loss is calculated in accordance with equations (1) and (2) as coverage loss=$S_{mid}/S_0$.

It should be noted that coverage loss may be calculated using measurements of a single physical channel and a single mid-way position as illustrated in FIG. 11A. Alternatively, coverage loss may be calculated using the average of two adjacent physical channel measurements and a mid-way position. Further averaging may be employed by measuring coverage loss for each pair n and n+1 for all n from 1 to N−1, and averaging the result of all coverage loss measurements. All such methods of measuring coverage loss are within the scope of the present invention.

Referring now to FIG. 11B, in step 110 an orthogonal EC array probe, having N individual EC sensors labelled n=1 to N, is used to scan the surface of a test object. In step 112 the array probe is advanced to the next scan position, and in step 114 the parameter n is set to 1 to begin data acquisition from the first sensor. In step 116, EC signals M(n) and M(n+1) are acquired from sensors n and n+1 respectively. Note that step 116 corresponds to the function of data acquisition unit 4 shown in FIG. 1. Note also that steps 118, 120, 122 and 124 correspond to the functions of virtual channel generator 6, as illustrated by enclosure of these steps within a broken line 130.

In step 118, virtual channel generator 6 determines whether M(n) and/or M(n+1) is greater than zero. If yes, virtual channel M(n+0.5) is generated at step 120 according to the vector analysis given by equation (6), with the value of cos θ taken from the calibration mode measurement shown in FIG. 11A If neither M(n) nor M(n+1) is greater than zero, virtual channel M(n+0.5) is generated at step 122 by simple averaging according to equation (7). In step 124 the virtual channel signal is output from virtual channel generator 6 according to either step 120 or step 122 as appropriate. In step 126 a check is made to determine whether all N individual EC sensors have been addressed. If n is less than N, n is incremented by one, and the process returns to step 116 to acquire data from the next sensor in the array. If not, the process returns to step 112 to acquire data at the next scan position.

Although the present invention has been described in relation to particular embodiments thereof, it can be appreciated that various designs can be conceived based on the teachings of the present disclosure, and all are within the scope of the present disclosure.

In example embodiments of the present invention, processing by the processor may be implemented in hardware, firmware, software, or a combination of any of them. For example, processing may be implemented in computer programs executed on programmable computers/machines that each includes a processor, a storage medium or other article of manufacture that is readable by the processor (including volatile and non-volatile memory and/or storage elements), at least one input device, and one or more output devices. In certain embodiments of the present invention, program code may be applied to data entered using an input device to perform processing and to generate output information.

Example embodiments of the present invention may be embodied by one or more programmable processors executing one or more computer programs to perform the functions of the system. Other example embodiments of the present invention may be implemented as special purpose logic circuitry (e.g., a field-programmable gate array (FPGA) and/or an application-specific integrated circuit (ASIC)). Yet other example embodiments of the present invention may be implemented using electronic hardware circuitry that include electronic devices such as, for example, at least one of a processor, a memory, a programmable logic device or a logic gate.

Some embodiments of the present invention may be implemented, at least in part, via a computer program product (e.g., in a non-transitory machine-readable storage medium such as, for example, a non-transitory computer-readable medium) for execution by, or to control the operation of, a data processing apparatus (e.g., a programmable processor, a computer, or multiple computers). In certain embodiments, each such program may be implemented in a high-level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. At times the program code is loaded into and executed by a machine, the machine becomes an apparatus for practicing the invention. At times the program code is implemented on one or more general-purpose processors, the program code combines with such a processor to provide a unique apparatus that operates analogously to specific logic circuits. As such, a general-purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

The flowcharts and block diagrams in the figures may illustrate the apparatus, method, as well as architecture, functions, and operations executable by a computer program product according to various embodiments of the present disclosure. Each block in the flowcharts or block diagrams may represent a module, a program segment, or a part of code, which may contain one or more executable instructions for performing specified logic functions. Therefore, the methods described herein are not limited to the specific examples described; rather, any of the method steps may be re-ordered, combined, removed, or performed in parallel or in serial, as necessary, to achieve the results embodying the claims. Further, each block and a combination of blocks in the block diagrams or flowcharts may be implemented by a dedicated, hardware-based system for performing specified functions or operations or by a combination of dedicated hardware and computer instructions.

Various exemplary embodiments of the present invention have been described with reference to the preceding drawings only as exemplary embodiments and the scope of the invention is limited only by the claims. These exemplary embodiments are provided only for enabling those skilled in the art to better understand and then further implement the present invention and are not intended to limit the scope of the present invention in any manner.

Further, example embodiments of the present invention may be practiced according to the claims without some or all of the specific details of the described embodiments. Therefore, the invention encompasses numerous alternatives, modified, and equivalent embodiments that may be conceived having a structure and method disclosed as herein and such alternative embodiments may be used without departing from the principles of and within the scope of the appended claims.

For the purpose of clarity, technical material that is known in the technical fields related to the invention has not been described in detail so that the invention is not unnecessarily obscured. Accordingly, the above embodiments of the present invention are to be considered as illustrative and not restrictive, and the invention is not to be limited to the details of the example embodiments given herein but may be modified within the scope and equivalents of the appended claims.

The terms "comprise(s)," "include(s)", their derivatives and like expressions used herein should be understood to be open (i.e., "comprising/including, but not limited to"). The term "based on" means "at least in part based on", the term "one embodiment" means "at least one embodiment", and the term "another embodiment" indicates "at least one further embodiment". Relevant definitions of other terms have been provided in the present disclosure.

What is claimed is:

1. An eddy current (EC) system for detecting a possible defect in a test object, the system comprising:
    an acquisition unit configured to receive EC response signals from at least two adjacent EC sensors, and wherein respective positions of the two EC sensors form two adjacent inspection channels at the times when the sensors form a test scanning path near a surface of the test object;
    a virtual channel generator configured to digitally generate a virtual channel according to a vector combination of digitized EC response signals of the two EC sensors; and
    a data processor configured to generate virtual signal data derived from the EC response signals and the virtual channel, and process the EC response signals and the virtual signal data to generate a defect signal indicative of the possible defect.

2. The EC system of claim 1, wherein the virtual channel generator further comprises an orientation determination unit configured to distinguish between a parallel response signal from a parallel defect having a long axis parallel to the scanning path and a perpendicular response signal from a perpendicular defect having a long axis perpendicular to the scanning path.

3. The EC system of claim 1, wherein the virtual channel generator is further configured to calculate a coverage loss, wherein the coverage loss is parallel response signal at times a parallel defect is located substantially mid-way between the two adjacent inspection channels, divided by the parallel response signal at times the parallel defect is located at one of the two adjacent inspection channels.

4. The EC system of claim 3, wherein the virtual channel generator is further configured to generate the virtual signal data for a parallel defect by calculating an average of the EC response signals from each of the two adjacent inspection channels divided by the coverage loss.

5. The EC system of claim 1, wherein the virtual channel generator is further configured to generate the virtual signal data for a perpendicular defect by calculating an average of the EC response signals from each the two adjacent inspection channels.

6. The EC system of claim 1, wherein the virtual signal data is available to the data processor in an impedance plane representation including real and imaginary signal components.

7. The EC system of claim 1, wherein the data processor is further configured to generate defect signals using a same algorithm for both the EC response signals and the virtual signal data.

8. The EC system of claim 1, wherein the data processor is further configured to calculate a defect size based on a maximum defect signal.

9. The EC system of claim 1 further comprising at least one EC array probe, which comprises the at least two adjacent EC sensors.

10. The EC system of claim 2, wherein the at least two EC sensors are orthogonal EC sensors, for which a parallel response signal has a first polarity and a perpendicular response signal has a second polarity.

11. A method of conducting an eddy current (EC) inspection for detecting a possible defect in a test object, the method comprising the steps of,
    acquiring EC response signals from at least two adjacent EC sensors, wherein respective positions of the two EC sensors form two adjacent inspection channels at the times when the sensors form a test scanning path near a surface of the test object;
    generating, digitally, a virtual channel according to a vector combination of digitized EC response signals of the two EC sensors and generating virtual signal data based on the EC response signals and the virtual channel; and processing the EC response signals and the virtual signal data to generate a defect signal indicative of the possible defect.

12. The method of claim 11 further comprising a calibration step, the calibration step comprises:
   acquiring a first calibration signal from a calibration defect having a long axis parallel to the scanning path and positioned along a first of the two adjacent inspection channels;
   acquiring a second calibration signal from the calibration defect positioned in the mid-way between the two inspection channels;
   acquiring a third calibration signal from the calibration defect having a long axis parallel to the scanning path and positioned along a second of the two adjacent inspection channels;
   calculating a first coverage loss by using the second calibration signal divided by the first calibration signal, and calculating a second coverage loss by using the second calibration signal divided by the third calibration signal, wherein the first and the second coverage loss are indicative of the EC characteristics of the two EC sensors in response to the calibration defect.

13. The method of claim 12, wherein the step of measuring a coverage loss further includes the step of averaging two or more coverage loss measurements from two or more adjacent pairs of the at least two adjacent inspection channels.

14. The method of claim 11, wherein the step of generating the virtual signal data further comprises a step of distinguishing the EC response signals due to a parallel defect having a long axis parallel to the test scanning path from the EC response signals due to a perpendicular defect having a long axis perpendicular to the test scanning path.

15. The method of claim 14, wherein acquiring EC response signals from the two adjacent inspection channels comprises acquiring EC response signals from orthogonal sensors and wherein the step of distinguishing the EC response signals comprises distinguishing between an EC response signal for the parallel defect having a first polarity and an EC response signal for the perpendicular defect having a second polarity.

16. The method of claim 11, wherein the step of generating the virtual signal data further comprises:
   calculating an average of the EC response signals for a perpendicular defect;
   calculating an average of the EC response signals divided by a coverage loss for a parallel defect calculated according to a reduction in a calibration signal from a defect mid-way between the at least two adjacent inspection channels.

17. The method of claim 11, wherein the virtual signal data and the EC response signals are presented in an impedance plane representation including real and imaginary signal components.

18. The method of claim 11, wherein the step of processing further includes generating defect signals using a same algorithm for both the EC response signals and the virtual signal data.

19. The method of claim 11, wherein the step of processing further includes calculating a defect size based on a maximum defect signal.

* * * * *